United States Patent
Plocher et al.

(10) Patent No.: US 6,234,438 B1
(45) Date of Patent: May 22, 2001

(54) HOLDING DEVICE FOR A DRINKS CONTAINER IN A MOTOR VEHICLE

(75) Inventors: Bernd Plocher, Rottenburg-Seebronn; Friedrich Notz, Freudenstadt; Ulrich Nienhaus, Nagold-Hochdorf; Steffen Breunig, Elztal-Dallau; Armin Kassel, Heimsheim, all of (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/307,038

(22) Filed: May 7, 1999

(30) Foreign Application Priority Data

May 13, 1998 (DE) ............................................... 198 21 313

(51) Int. Cl.⁷ ........................................................ A47K 1/08
(52) U.S. Cl. ........................................ 248/311.2; 224/926
(58) Field of Search ........................... 248/311.2, 278.1, 248/280.11; 224/926; 297/188, 194

(56) References Cited

U.S. PATENT DOCUMENTS

| | | | |
|---|---|---|---|
| 4,907,775 | * 3/1990 | Lorence et al. | 248/311.2 |
| 5,060,899 | * 10/1991 | Lorence et al. | 248/311.2 |
| 5,228,611 | * 7/1993 | Yabuya | 248/311.2 |
| 5,297,709 | * 3/1994 | Dykstra et al. | 248/311.2 |
| 5,494,249 | * 2/1996 | Ozark et al. | 224/926 |
| 5,618,018 | * 4/1997 | Baniak | 248/311.2 |
| 5,692,718 | * 12/1997 | Bieck | 224/926 |
| 5,762,307 | * 6/1998 | Patmore | 248/311.2 |
| 5,791,617 | * 8/1998 | Boman et al. | 248/311.2 |
| 6,036,152 | * 3/2000 | Hiscox et al. | 248/311.2 |

FOREIGN PATENT DOCUMENTS 44 29 515 C1   11/1995  (DE) .

* cited by examiner

Primary Examiner—Ramon O. Ramirez
Assistant Examiner—J. DeLuca
(74) Attorney, Agent, or Firm—Michael J. Striker

(57) ABSTRACT

The holding device for a drinks container is designed to be installed in the center console of an automobile. It has first drinks container holder (36), which is slidable upward in a laterally oriented initial position from a withdrawn position and subsequently pivotable into a horizontally oriented upright position of use. A first pivot locking device (60,62, 64,66) is provided for keeping the first drinks container holder (36) in the substantially laterally oriented initial position against the force of a pivoting spring element until it reaches an upper end position. When it reaches the upper end position, an unlocking device (68,70) is engaged which automatically unlocks the first locking device so that the first drinks container holder (36) can pivot into the horizontally oriented upright position of use. A second locking device is provided for retaining the first drinks container holder (36) in the horizontally oriented upright position of use.

6 Claims, 4 Drawing Sheets

HOLDING DEVICE FOR A DRINKS CONTAINER IN A MOTOR VEHICLE

BACKGROUND OF THE INVENTION

The invention relates to a holding device for a drinks container in a motor vehicle and, more particularly, to a holding device for a drinks container in an automobile having a first drinks container holder that is movable from a withdrawn initial position into a position of use and which is intended, in particular, for recessed mounting in the center console of the motor vehicle.

A holding device for a drinks container of this kind is known from German Patent Document DE 44 29 515 C1. The known holding device comprises a drinks container holder with an insertion opening for insertion of the drinks container, for example, a cup, a beaker, or a can of drink. The drinks container holder is arranged horizontally and is slidably guided vertically from a withdrawn initial position into a raised position of use. The drinks container holder is approximately in the form of a cube, the width of which is somewhat larger than the diameter of the drinks container to be held. The known holding device has the disadvantage that it requires a mounting space with a base area of a length and width larger than the diameter of the drinks container to be housed in it.

SUMMARY OF THE INVENTION

It is an object of the present invention to construct a holding device for a drinks container that can be recessed into the center console of a motor vehicle, so that it requires a mounting space with a small base area.

According to the invention the holding device for a drinks container in a motor vehicle comprises a first drinks container holder and means for pivoting the first drinks container holder from a substantially laterally oriented initial position into a horizontally oriented upright position of use.

The drinks container holder of the holding device according to the invention is arranged to pivot from a laterally oriented initial position into a horizontal, upright position of use, in which a drinks container can be inserted in an upright position into the drinks container holder. A laterally oriented initial position means that the drinks container holder is pivoted, relative to the position of use, through about 90° to one side, so that, in the initial position, one side (long side or narrow side) of the drinks container holder is positioned underneath and the opposite side is positioned at the top. A base or an underside of the drinks container holder stands vertically in the initial position. If the drinks container holder is of approximately cylindrical form, it is pivoted from the laterally oriented initial position with a horizontally oriented axis into the upright position of use with a vertically oriented axis.

To hold the drinks container securely in a motor vehicle while the vehicle is being driven, it is sufficient for a drinks container holder to have a height that is less than the diameter of the drinks container to be inserted. The drinks container holder can therefore be constructed with a height that is less than the width or the length of the drinks container or the diameter thereof. Pivoting into the laterally oriented initial position therefore requires a mounting space having a base area with a side length that is somewhat larger than the height of the drinks container holder (in the position of use). The required base area of the mounting space can consequently be reduced. A further advantage of the holding device according to the invention is that, in the withdrawn initial position of the drinks container holder, an upper opening of the mounting space for the holding device can be closed by the side (narrow side or long side) of the drinks container holder lying uppermost in the laterally oriented initial position. It is not necessary for the drinks container holder to lie horizontally in its withdrawn initial position, it can also lie obliquely, especially when the installation space available is oblique. The pivoting angle then differs from 90° in accordance with the inclination of the mounting space.

In one embodiment of the invention, the holding device has a slide displaceable vertically or obliquely between a lower and an upper position, on which the drinks container holder is mounted with the pivoting device. In this embodiment of the invention, the drinks container holder is displaced upwardly into its laterally oriented, withdrawn initial position and is subsequently pivoted into the upright position of use. This embodiment of the invention has the advantage that the pivoting movement of the drinks container holder takes place outside the mounting space, which means that there is no need for the mounting space to be enlarged for the pivoting movement, so that the mounting space can be kept small.

The pivoting arrangement can be in the form, for example, of a pivotal articulation with a pivoting axle. The pivoting arrangement can also be constructed with a lever mechanism or a curved guide.

In a preferred embodiment, the invention has a pivoting spring element, which pivots the drinks container holder out of the initial position into the position of use. In order to hold the drinks container holder in the initial position against the force of the pivoting spring element, a first locking device is provided. This can be unlocked manually. In an embodiment of the invention having the slide, the locking device is unlocked automatically when the slide reaches its upper end position.

To safeguard the drinks container holder from being accidentally pivoted out of the position of use, one embodiment of the invention provides a second locking device, which locks the drinks container holder in its horizontally oriented, upright position of use.

In a preferred embodiment of the invention, a spring element for the slide is provided, which displaces the slide upwardly from a lower position.

When the holding device is not in use, a locking device for the slide holds the slide in its lower position, in which the drinks container holder is located in its laterally oriented initial position. By unlocking the slide-locking device, the drinks container holder is automatically moved upwards and subsequently automatically pivoted into the horizontal position of use.

In another embodiment of the invention, the holding device has two drinks container holders, the second one of which is housed in the first drinks container holder so that, for example, it can be laterally pivoted out for use. If only one drinks container holder is required, the second drinks container holder can remain in the first drinks container holder.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
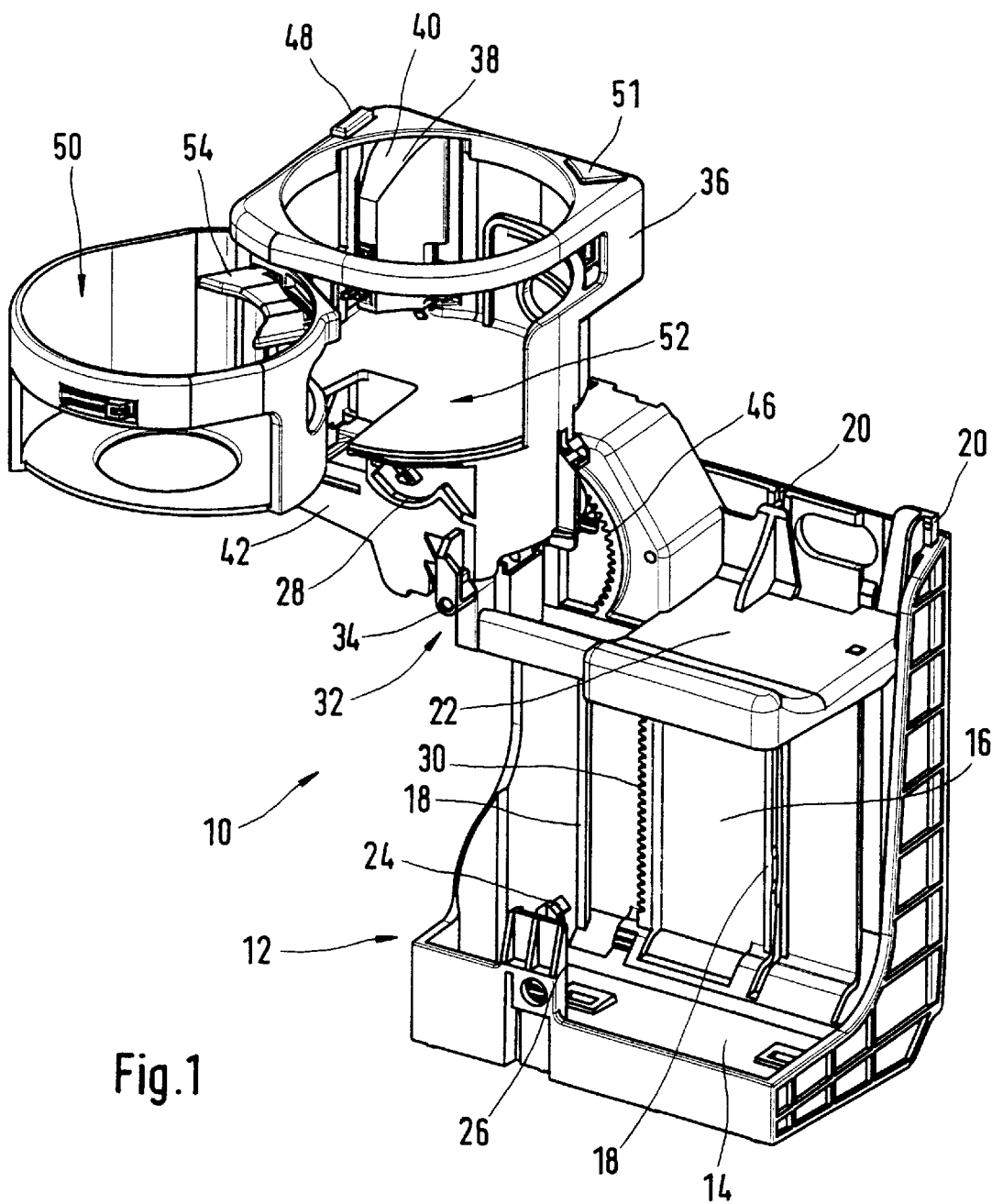
FIG. 1 is a perspective view of a holding device for a drinks container according to the invention shown in a horizontally oriented position of use.
Figure 2:
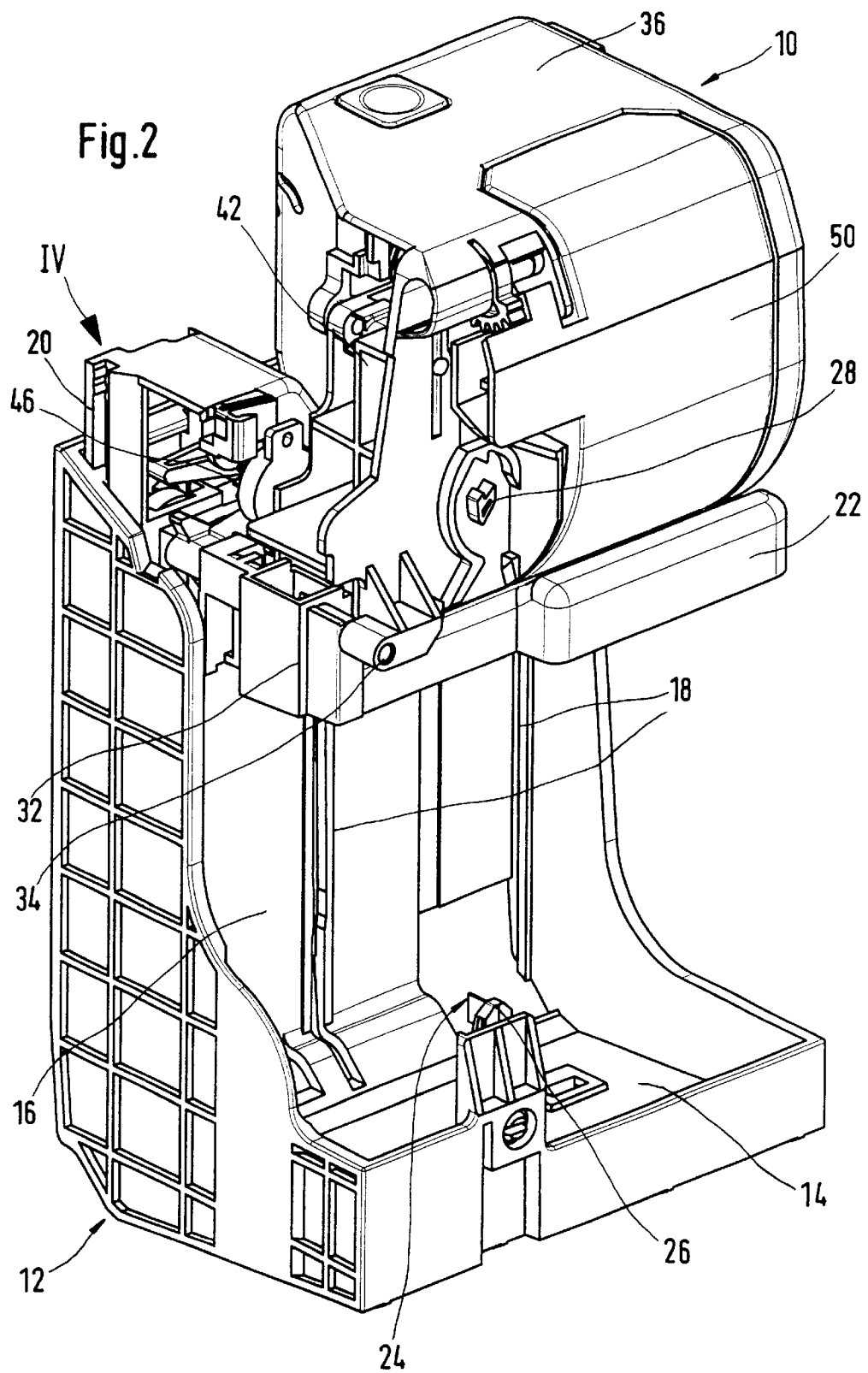
FIG. 2 is a perspective view of the holding device shown in FIG. 1 in an intermediate position.
Figure 3:
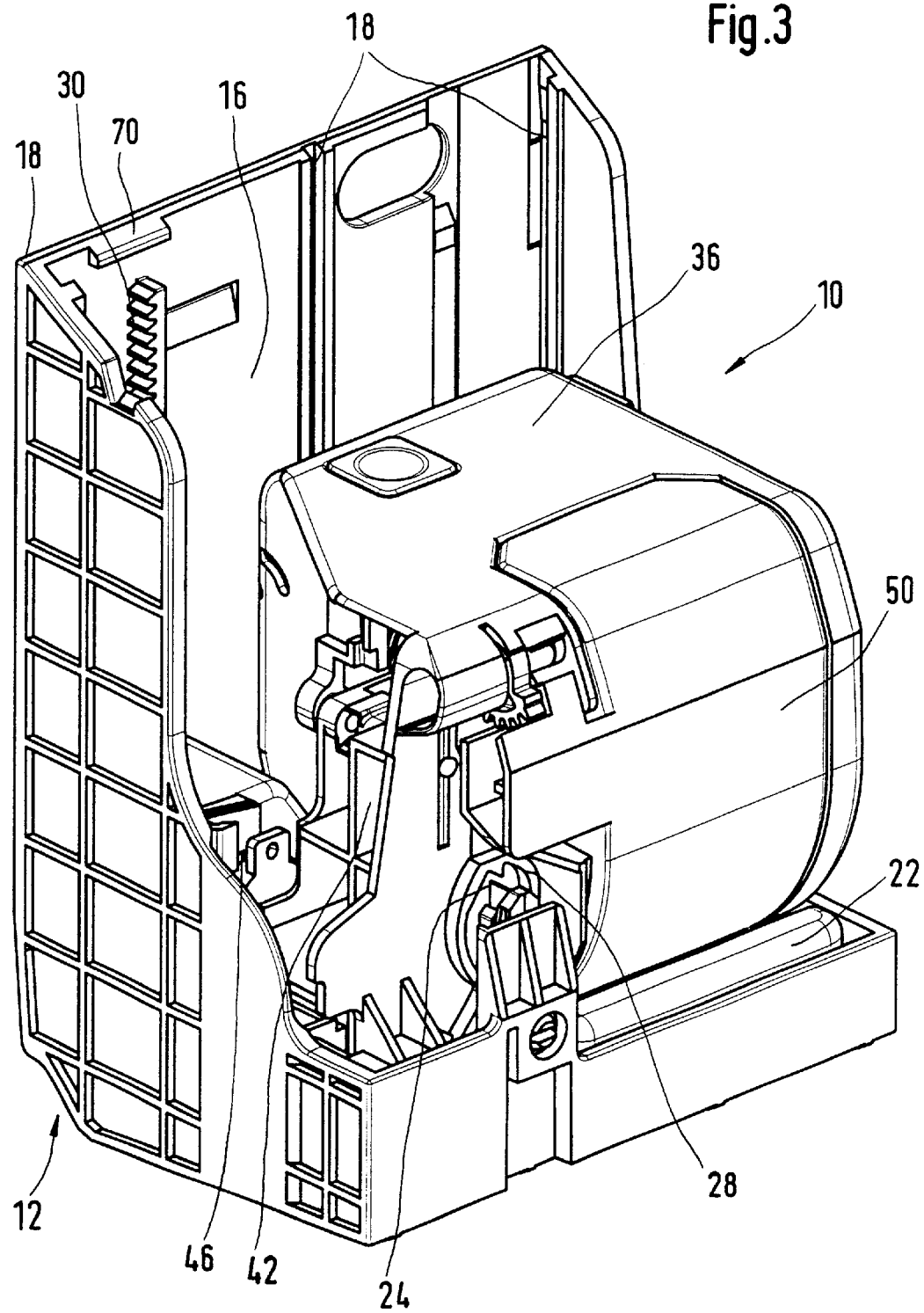
FIG. 3 is a perspective view of the holding device shown in FIG. 1 in a substantially laterally oriented initial position.

The holding device according to the invention illustrated in FIGS. 1 to 3 and denoted generally by the reference number 10 comprises a framework 12 having a base 14 and perpendicular thereto a side wall 16 which is vertical in the installed position of the holding device 10. The holding device 10 is designed to fit into a mounting space in an unshown center console of a passenger car. The mounting space has a prismatic shape which complements the shape of the framework 12, with a rectangular base area.

Vertically upwardly extending guide channels 18, in which three springs 20 are displaceably received, are arranged on both sides on the framework 12 and in the middle of the side wall 16. The springs 20 are integral with a slide 22. Guide channels 18 and springs 20 form a slideway for the slide 22, by means of which the slide 22 is slidably guided vertically on the framework 12. Displacement of the slide 22 is effected by means of a scroll spring, known per se and not shown in the drawing, that is, a flat spiral spring which rolls itself up. The rolled spring forms a spring element for the slide and draws the slide 22 upwards on the side wall 16 of the framework 12.

The slide 22 can be pressed downwards against the force of the slide spring element, not shown, to the base 14 of the framework 12. In its lower position, the slide 22 is held by a slide-locking device, which is constructed in a manner known per se as a locking device with a heart-shaped curve (push-push mechanism). The slide-locking device has a peg 24, which is triangular in cross-section, at one end of a pivoting bolt member 26, which is pivotally mounted on the framework 12. Furthermore, the heart-shaped locking device has a heart-shaped curve 28 with which the peg 24 engages and hence locks the slide 22 when the slide 22 is displaced into its lower position. Brief downward pressure on the slide 22 unlocks the slide-locking device in a manner known per se.

Displacement of the slide 22 is damped by means of a rotary damper known per se, not shown in the drawing, the gear wheel of which meshes with a toothed rack 30 mounted to run vertically on the side wall 16.

The holding device 10 has a pivoting device in the form of a pivotal articulation 32. The pivotal articulation 32 comprises a pivot pin 34 of metal, which is mounted horizontally and perpendicular to the side wall 16 of the framework 12 at an edge of the slide 22. By means of the pivotal articulation 32, a drinks container holder 36 is pivotally connected to the slide 22 so as to be swung out of a laterally oriented initial position, as illustrated in FIGS. 2 and 3, into a horizontal, upright position of use, as illustrated in FIG. 1. The drinks container holder 36 is roughly cubical with an approximately square base area, one corner of the square base area being replaced by a quarter circle. The drinks container holder 36 has an insertion opening 38 of circular cross-section for insertion, for example, of a drinks can. The drinks container holder 36 is provided in a manner known per se with a compensating flap 40 pivoting under spring action into the insertion opening 38 and which is pressed outwardly when a drinks container is inserted into the insertion opening 38. The compensating flap 40 presses a drinks container inserted into the insertion opening 38 against an opposing side of the insertion opening 38 and consequently ensures that drinks containers of different diameter are securely held in the drinks container holder 36.

On its underside, the drinks container holder 36 has an integral ribbed under-structure 42 on which the pivotal articulation 32 is formed. Furthermore, the heart-shaped curve 28 of the slide-locking device is mounted on a side of the under-structure 42 of the drinks container holder 36. To pivot the first drinks container holder 36 from its laterally oriented initial position (FIG. 2) into its horizontal, upright position of use (FIG. 1), a pivoting spring element in the form of a leg spring, not shown in the drawing, is provided, one leg of which acts on the slide 22 and the other leg of which acts on the under-structure 42 of the first drinks container holder 36. The pivoting movement of the first drinks container holder 36 is damped by a rotary damping element, not shown in the drawing, the gear wheel of which meshes with an internal gear wheel segment 46 fixedly mounted on the slide 22. The internal gear wheel segment 46 is arranged coaxially with respect to the pivot pin 34 of the pivotal articulation 32 and extends over a circular arc, which is longer than a quarter circle and shorter than a half-circle.

Figure 4:
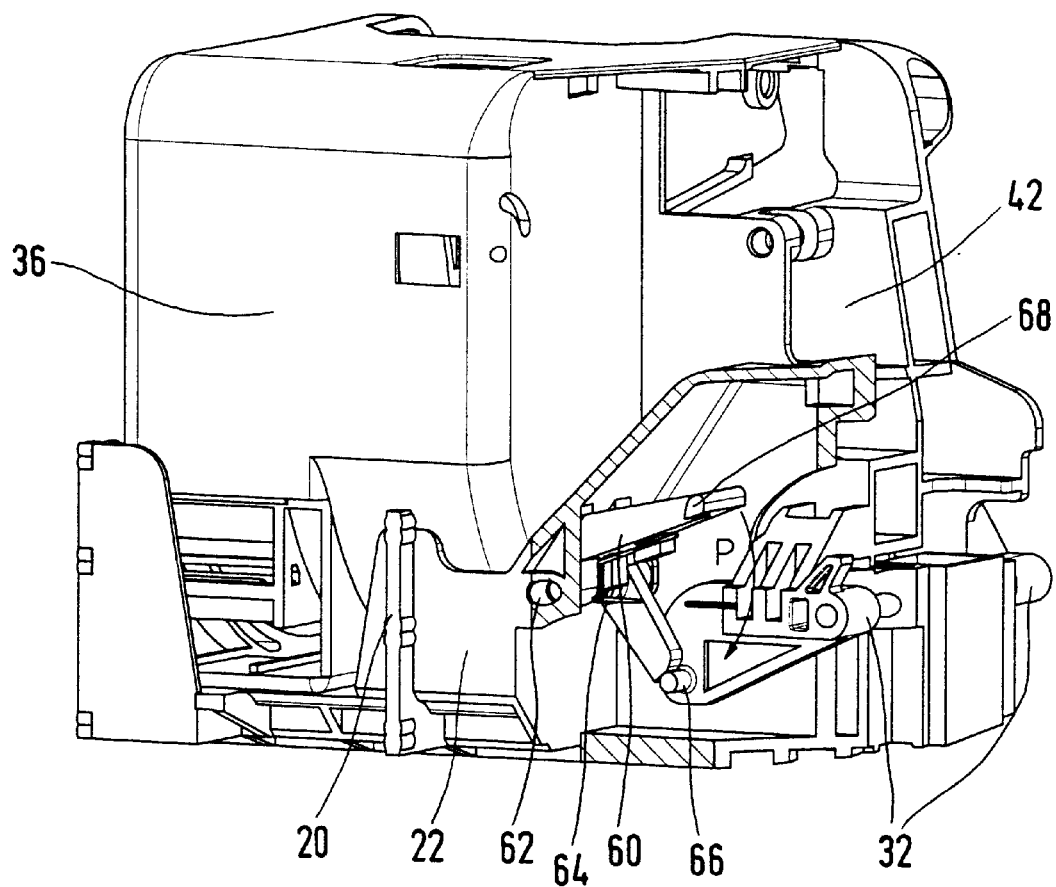
FIG. 4 is a detailed view of the holding device in the direction of the arrow IV in FIG. 2.

The holding device 10 according to the invention has a locking device which locks the first drinks container holder 36 in its laterally oriented initial position against the force of the pivoting spring element, not shown in the drawing, when the slide 22 is not located in its upper position. This locking device illustrated in FIG. 4 comprises a two-armed locking lever 60 which is connected to the under-structure 42 of the drinks container holder 36 so as to pivot about a pivot pin 62. The pivot pin 62 is arranged parallel to, at a distance from and at the approximately the same level as, the pivot pin of the pivotal articulation 32 of the drinks container holder 36. The locking lever 60 is pivoted by a leg spring 64 in the direction indicated by the arrow P, in which it engages over a peg 66 when the drinks container holder 36 is located in its laterally oriented initial position. This position is illustrated in FIG. 4. The peg 66 is mounted on the under-structure 42 of the drinks container holder 36 at a distance from the pivotal articulation 32 and projects laterally. The locking lever 60 engaging over the peg 66 of the drinks container holder 36 locks the drinks container holder 36 in its laterally oriented initial position against the force of the leg spring, not shown in the drawing, which presses the drinks container holder 36 towards the horizontally oriented upright position of use.

The drinks container holder 36 is automatically unlocked from its laterally oriented initial position when the slide 22 reaches its upper end position. Shortly before the slide reaches its upper end position, a laterally projecting unlocking peg 68 integral with the locking lever 60 runs against a stop 70 (FIG. 3), which is arranged at the top of the side wall 16 of the framework 12. The stop 70 pivots the locking lever 60 through a small angle against the force of the leg spring 64 in the direction opposite to that indicated by the arrow P in FIG. 4, so that the peg 66 on the under-structure 42 of the drinks container holder 36 comes clear of the locking lever 60. The drinks container holder 36 is unlocked and is pivoted upwards by the leg spring, not shown, into the horizontally oriented upright position of use. After manually unlocking the locking device with the heart-shaped curve 24, 26, 28 by briefly depressing the first drinks container holder 36, the first drinks container holder moves under spring action upwards out of its withdrawn initial position, in which it lies on edge (FIG. 3), together with the slide 22, and subsequently pivots into its horizontal position of use (FIG. 1).

To prevent accidental pivoting of the drinks container holder 36, the holding device 10 includes a second locking device, which locks the first drinks container holder 36 in its horizontal, upright position of use. The second locking device is arranged to be manually unlocked by depressing a button 48 on a top side of the first drinks container holder 36.

A second drinks container holder 50 of substantially cylindrical form is housed in the first drinks container holder 36 and is arranged to be pivoted laterally outwards. To pivot the second drinks container holder 50 outwards, the first drinks container holder 36 is provided with an aperture 52, which extends over part of a circumference of the insertion opening 38 of the first drinks container holder 36. At a point on its periphery, the second drinks container holder 50 has upwardly extending and downwardly extending pivot pins, not shown in the drawing, which engage in complementary holes at a corner of the first drinks container holder 36. The pivoting movement is effected in a manner known per se under spring action, and is damped by means of a rotary damper known per se, not shown in the drawing. The second drinks container holder 50 is locked in the position in which it is pivoted inwards into the first drinks container holder 36 by means of a locking device, which is releasable by means of a button 51 on the top side of the first drinks container holder 36. The second drinks container holder 50 has a compensating flap 54 pivotable about a horizontal axis, which pivots under spring action into the second drinks container holder 50 and hence securely holds drinks containers of different diameter.

The framework 12, the slide 22, the two drinks container holders 36, 50 and further small parts of the holding device 10 are manufactured from plastics material as injection molded parts.

The disclosure in German Patent Application 198 21 313.1 of May 13, 1998 is incorporated here by reference. This German Patent Application discloses the invention described hereinabove and claimed in the claims appended hereinbelow and provides the basis for a claim of priority for the instant invention under 35 U.S.C. 119.

While the invention has been illustrated and described as embodied in a holding device for a drinks container of the above-described kind, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A holding device for a drinks container in a motor vehicle, said holding device comprising
    a first drinks container holder (36) comprising means for holding the drinks container, said first drinks container holder (36) having a substantially laterally oriented initial position and a horizontally oriented upright position use;
    pivot means (32) for pivoting the first drinks container holder (36) from the substantially laterally oriented initial position into the horizontally oriented upright position of use, said pivot means (32) for pivoting the first drinks container holder (36) comprising a pivoting spring element arrange to urge the first drinks container holder (36) out of the substantially laterally oriented initial position into the horizontally oriented upright position use;
    a slideway (18, 20), on which said first drinks container holder (36) is guided slidably upwards while remaining in the substantially laterally oriented initial position;
    a slide (22) guided slidably on said slideway (18, 20), said first drinks container holder (36) being pivotally mounted on said slide (22) by means of said pivot means (32) for pivoting the first drinks container holder;
    a first locking means (60,62,64,66) for retaining the first drinks container holder (36) in the substantially laterally oriented initial position against the force of the pivoting spring element while said first drinks container holder (36) is guided upwards on said slideway and until the slide (22) reaches an upper end 22 position; and
    means (68,70) for automatically unlocking the first locking means when the slide (22) reaches the upper end position.

2. The holding device as defined in claim 1, further comprising a second locking means for fixing said first drinks container holder (36) in the horizontally oriented upright position of use.

3. The holding device as defined in claim 1, further comprising another spring element for slidably displacing the slide (22) upwards from below toward the upper end position, and a slide-locking device (24, 26, 28) for holding said slide (22) in a lower position thereof against the force of the another spring element for slidably displacing the slide upwards.

4. A holding device for a drinks container in a motor vehicle, said holding device comprising
    a first drinks container holder (36) comprising means for holding the drinks container, said first drinks container holder (36) having a substantially laterally oriented initial position and a horizontally oriented upright position of use;
    a second drinks container holder (50) for holding the drinks container;
    means for mounting said second drinks container holder (50) in said first drinks container holder and for moving said second drinks container holder out from said first drinks container holder (36) when said first drinks container holder (36) is in said horizontally oriented upright position of use;
    pivot means (32) for pivoting the first drinks container holder (36) from the substantially laterally oriented initial position into the horizontally oriented upright position of use, said pivot means (32) for pivoting the first drinks container holder (36) comprising a pivoting spring element arrange to urge the first drinks container holder (36) out of the substantially laterally oriented initial position into the horizontally oriented upright position of use;
    a slideway (18, 20), on which said first drinks container holder (36) is guided slidably upwards in the substantially laterally oriented initial position;
    a slide (22) guided slidably on said slideway (18, 20), said first drinks container holder (36) being pivotally mounted on said slide (22) by means of said pivot means (32) for pivoting the first drinks container holder;

a first locking means (60,62,64) for retaining the first drinks container holder (36) in the substantially laterally oriented initial position against the force of the pivoting spring element while said first drinks container holder (36) is guided upwards on said slideway and until the slide (22) reaches an upper end position; and means (68,70) for automatically unlocking the first locking means when the slide (22) reaches an upper end position.

5. A holding device for a drinks container in a motor vehicle, said holding device comprising a first drinks container holder (36) comprising means for holding the drinks container, said first drinks container holder (36) having a substantially laterally oriented initial position and a horizontally oriented upright position of use;

pivot means (32) for pivoting the first drinks container holder (36) from the substantially laterally oriented initial position into the horizontally oriented upright position of use, said pivot means (32) for pivoting the first drinks container holder (36) comprising a pivoting spring element arrange to urge the first drinks container holder (36) out of the substantially laterally oriented initial position into the horizontally oriented upright position of use;

a first locking means (60,62,64,66) for retaining the first drinks container holder (36) in the substantially laterally oriented initial position against the force of the pivoting spring element while said first drinks container holder (36) is guided upwards and until the first drinks container holder (36) reaches an upper end position; and means (68,70) for automatically unlocking the first locking means when the first drinks container holder (36) reaches the upper end position.

6. The holding device as defined in claim 5, further comprising a slideway (18, 20), on which said first drinks container holder (36) is guided slidably upwards in the substantially laterally oriented initial position and a slide (22) guided slidably on said slideway (18, 20), said first drinks container holder (36) being pivotally mounted on said slide (22) by means of said pivot means (32) for pivoting the first drinks container holder.

\* \* \* \* \*